United States Patent [19]  [11] Patent Number: 4,764,282
Snyder  [45] Date of Patent: Aug. 16, 1988

[54] DISPOSAL OF TOXIC AND POLYMERIC WASTES

[75] Inventor: Robert H. Snyder, Grosse Point Park

[73] Assignee: The Uniroyal Goodrich Tire Company, Akron, Ohio

[21] Appl. No.: 911,831

[22] Filed: Sep. 26, 1986

[51] Int. Cl.$^4$ ................................................. C02F 1/28
[52] U.S. Cl. .................................. 210/690; 210/769; 210/909; 55/74; 44/500
[58] Field of Search ................ 210/680, 679, 690–693, 210/908, 909, 924, 769, 774; 55/74–79; 44/1 R, 1 C, 1 D

[56] References Cited

U.S. PATENT DOCUMENTS

| | | | |
|---|---|---|---|
| 3,215,623 | 11/1965 | Hix | 210/24 |
| 3,567,660 | 3/1971 | Winkler | 210/680 X |
| 3,687,297 | 8/1972 | Kuhn et al. | 210/502 |
| 3,739,913 | 6/1973 | Bogosian | 210/924 X |
| 4,237,237 | 12/1980 | Jarre et al. | 521/128 |
| 4,276,179 | 6/1981 | Soehngen | 210/679 |
| 4,342,811 | 8/1982 | Lopatin et al. | 428/220 |
| 4,430,230 | 2/1984 | Satake | 210/691 |
| 4,505,823 | 3/1985 | Klein | 210/668 |
| 4,526,677 | 7/1985 | Grantham et al. | 210/909 X |

Primary Examiner—Tom Wyse
Attorney, Agent, or Firm—John D. Haney

[57] ABSTRACT

A process for disposing of toxic organic waste fluids comprising contacting a polymeric carrier particle, such as ground tire rubber, with a toxic organic fluid that dissolves in the solid polymeric carrier. The waste fluid dissolved in the polymeric carrier forms a stable product for transportation and incineration.

10 Claims, No Drawings

DISPOSAL OF TOXIC AND POLYMERIC WASTES

BACKGROUND OF THE INVENTION

The present invention relates to the disposal of waste halogenated hydrocarbons, which term shall include hydrocarbons with or without heteroatoms such as oxygen, nitrogen and sulfur. The present invention also relates to a method for the production of a solid fuel with absorbed halogenated hydrocarbons, the method comprising contacting a rigid polymeric carrier material with liquid or vaporous halogenated hydrocarbons, whereby absorption of the fluid creates the solid fuel. The resulting solid fuel is suitable for safe transportation and for destruction of the halogenated hydrocarbon by incineration.

Presently an area of particular concern in the waste disposal field is that of the disposal of toxic liquid halogenated hydrocarbon wastes. These normally liquid wastes are prevalent in such varied fields as the chemical, petrochemical, rubber, textile, and utilities industries, of which fields this is but a partial listing. The disposal of these chemical wastes requires the dedication of administrative, technical, and capital resources of the responsible for generation of the wastes and also those of related industries. Careful and sensitive handling of halogenated hydrocarbon wastes is required, which is largely due to the severe health and environmental risks normally associated with halogenated hydrocarbons in the food chain. If mishandled, the effects of these wastes can be adverse over a long term due to the persistence of halogenated hydrocarbons in the biosystem.

The chemical and natural environmental factors contributing to biodegradability, such as bacterial decomposition, are ineffective on this generally highly toxic class of stable chemical compounds. An additional problem is the fluid nature or volatility of liquid halogenated hydrocarbons giving them mobility which allows diffusion from waste or dumping sites into aquifers, with the resulting risk of contaminating potable ground water. Alternatively, if spilled, the compounds may vaporize into the air and photolytically decompose with undesirable environmental results.

As a surface water pollutant, waste halogenated hydrocarbons have been found to concentrate in various levels of the human food chain. In particular, these hydrocarbons tend to dissolve and become concentrated in various fatty esters. Halogenated hydrocarbon concentrations in the fat tissues of fish have been measured at levels greatly in excess of that of the concentrations of the same compounds in the ground water in which they are found. In the Lake Michigan area, for example, the high levels of halogenated hydrocarbons in fish tissue have been an extreme burden on the commercial fishing industry, which in some cases has been legislatively banned.

The severity of the health hazards posed by halogenated hydrocarbons in part formed the incentive behind passage of the Toxic Substance Control Act. This act has a specific provision dealing with polychlorinated biphenyls (PCB).

These problems are conventionally solved by using stable land fills and incineration. Land fills involve low energy and capital cost expenditures in comparison to incineration. However, political problems are often associated with such sites and the relatively scarcity of stable sites puts their general future feasibility in doubt.

Incineration is a viable alternative especially in light of the specially equipped incineration ships for burning chemical wastes offshore. However, destruction of chemical wastes requires transport to the destruction site, high temperatures and is energy intensive, partly because the halogenated hydrocarbons, which are of primary concern, are themselves not flammable or combustible.

Accordingly, it is an object of the instant invention to provide a method for reducing the energy costs associated with incendiary destruction of organic wastes with the use of an appropriate waste fuel source. An additional object is to form a stable, relatively innocuous product suitable for transportation of the incineration site.

These and other objects, as well as the scope, nature and utilization of the invention, will be apparent to those skilled in the art from the following description and the appended claims.

SUMMARY OF THE INVENTION

The present invention concerns a process for the disposal of toxic organic wastes. The process comprises initially providing a polymeric carrier medium or particle, which carrier medium is contacted with a toxic organic waste fluid or solution. As a result, the toxic waste fluid (solution) is absorbed into the polymeric carrier medium. The process forms a stable product that can be safety transported and incinerated.

In another embodiment, the present invention also contemplates the product formed by the above process.

DETAILED DESCRIPTION OF THE PREFERRED EMBODIMENTS

In accordance with the present invention, there is provided a polymeric carrier particle which has an absorption capacity for toxic organic wastes. The polymeric carrier is preferably obtained from a low cost and abundant source which is itself preferably a waste polymer suitable for incineration.

The polymeric carrier is desirably suited to be chopped or otherwise comminuted to a desired particle size by a conventional method. Rigid reinforcement of the polymer by vulcanization or other well known methods makes it suitable for chopping or grinding. As contemplated by the present invention, grinding increases the absorption rate of the carrier while rendering it into a suitable size for transportation, handling and ultimately for use as a solid fuel in a conventional incinerator.

There is additionally provided a toxic organic fluid to be absorbed into the polymeric carrier. The polymeric carrier and toxic organic waste are chosen so as to be mutually soluble for incinerating disposal. The toxic organic waste must be capable of absorbing into the polymeric carrier particle at a rate and capacity such as to be economically feasible. The polymeric materials should be capable of being burned and will preferably burn at a temperature in excess of that needed to destroy the absorbed organic waste. The organic waste absorbed into the polymeric carrier renders the product stable for transportation and handling to its contemplated end use as an incineration product, thereby conveniently disposing of both the toxic waste and the waste polymeric carrier.

More specifically in accordance with the instant invention there is provided a polymeric carrier material in a particulate form, preferably rubber, with a high surface area to volume ratio and/or a high diffusion coefficient. The polymeric carrier material should have a high absorption capacity for the preselected toxic organic fluid wastes which require disposal. The polymeric carrier is preferably a waste polymer which is readily available at a low cost and has a high permeability and/or a high swelling index.

The permeability of an organic, vaporous material in a polymeric material depends on the solubility and diffusion rate of the vapor molecules in the polymer and both parameters are high for like or similar materials. A preferred polymeric carrier meeting these desirable requirements for halogenated hydrocarbons would be scrap or waste vulcanized rubber such as that obtained from scrap tires. Typical rubber found in scrap tires are the natural or synthetic rubber, butyl rubber, SBR, polybutadiene and/or EPDM.

Rubber from a scrap tire source is an extremely viscous liquid and, as such, can act as a solvent for waste organic fluids in the liquid or vapor phase. Vulcanized rubber, because of its dimensional stability, is commonly perceived as a solid material. However, from a physico-chemical standpoint, it is a true liquid and retains most of the properties of other liquids, including the capacity to dissolve large quantities of other compatible liquids, solids or gases.

The general solvent characteristics of these scrap rubbers can be analogously compared to benzene, xylene or naptha for purposes of comparison. Generally, the absorptive capacity of scrap rubber is better than that of saturated hydrocarbons but not quite as good as a pure aromatic resin.

Scrap vulcanized rubber has further advantages for use as a preferred polymeric carrier in that it is a vulcanized rubber which normally has a high proportion of a carbon black reinforcing filler. Vulcanization, depending on the requirement and method of preparation, provides various amounts of cross linking between the rubber polymers. Carbon black, as a reinforcing filler, acts as a weak chemical bonding agent that prevents elastic slippage at free areas of the polymeric chain (i.e. those areas without adjacent vulcanization cross linking).

Vulcanized cross linking and carbon black reinforcement provide a number of advantages to polymeric carrier particles in accordance with the principles of the present invention. Cross linking rigidly bonds adjacent polymeric chains yet allows elastic slippage at distal points from the cross linkages. Complementing the vulcanization cross linking, the use of carbon black filler will prevent distal point elastic slippage.

In a first distinct advantage, cross linking and optionally carbon black fillers provide the tensile strength and stiffness required for grinding the viscous liquid polymeric material that is the source of the carrier particles.

In a second major advantage, cross linking and optionally carbon black prevent the comminuted particles from reagglomerating and fusing into a unified mass of low surface to volume ratio.

Cross linking in a third distinct advantage allows the rubber or polymer to maintain its structural integrity when contacting liquid halogenated hydrocarbons or organic wastes. As a matter of comparison, unvulcanized or noncrosslinked polymers in contact with a liquid halogenated hydrocarbon, for example, will, if left for a sufficient period of time, soften, fuse, become tacky and even dissolve if an abundance of the contacting organic liquid is present. In the present invention, however, the carrier polymer or rubber particles will tend to swell isotropically even when exposed to substantial quantities of the absorbed toxic organic fluid in the contacting step.

The polymeric material found in scrap tires, as mentioned above, commonly contains reinforcing fillers such as carbon black or reinforcing fibers such as nylon or polyester. This adds additional tensile strength and stiffness to the rubber end products, further enhancing the comminutability characteristics of the rubber while increasing its structural integrity as a polymeric carrier.

A particular distinct advantage of carbon black filler is that it also increases the temperature at which the rubber burns. The importance of this advantage increases as the temperature of decomposition of the desired waste organic liquid to be incinerated increases.

It should also be understood that by using comminuted (chopped) rubber tires, one is able to choose the particle size that is optimum from the standpoint of absorption rate and/or burning rate. The particle size may, for example, be as small as about 100 mesh or as large as three inch chips.

Scrap rubber is further an advantageous polymeric carrier due to its low cost and relative abundance. Scrap rubber is frequently disposed of by chopping scrap tires, for example, into uniform sized pieces and used as fuel or supplementary fuel in a boiler. Their recognized appropriateness for use as a fuel makes them particularly useful as polymeric carriers for toxic wastes to be incinerated.

The range of organic waste fluids which can be absorbed onto a polymeric carrier would be broadly correlative to the particular availability of compatible polymeric carriers and whether they can be obtained at a low cost at an abundant supply to the particular disposer. Halogenated hydrocarbons are particularly well suited for disposal by the methods of the present invention because of the abundance of low cost rubber polymeric carriers and their general suitability for incendiary disposal. The halogenated hydrocarbons can optionally contain hetero atoms such as oxygen, nitrogen or sulfur.

Polychlorinated biphenyls, vinyl chloride, carbon tetrachloride, mono- and di-chlorobenzene(s), and tetrachloroethylenes are toxic volatile organic wastes generally disposed of by incineration which are found to absorb into scrap rubber to form a solution. These particular compounds are particularly unsuitable for landfill disposal because of their extreme toxicity and persistance in the environment. Other exemplary toxic halogenated hydrocarbons include dioxin, dibromochloroprene, DDT, dieldrin, mirex, ethylene dibromide, perchloroethylene, polybrominated biphenyls, etc., which could find application in the present method of disposal by incineration in a waste polymeric carrier.

Halogenated compounds in solid form may also be disposed of in accordance with the invention. The solid or crystalline halogen compounds will first be conveniently dissolved in a mutually miscible solvent to expedite absorption into the viscous rubber matrix. The dissolved halogen compound in the solvent media will then be absorbed into the polymeric carrier in accordance with the above-described contacting step.

The halogenated hydrocarbon and rubber polymeric carrier particles are brought into intimate contact in a contacting step to form the incineration product according to the invention. The scrap rubbers used preferably have a high permeability to halogenated hydrocarbon. In intimate contact the rate of organic waste fluid absorption is limited by the diffusion coefficient of the polymeric carrier and the surface area to volume ratio of the carrier.

The diffusion coefficient or gas permeability of the polymeric carrier particles are preestablished by factors of choice and availability. However, the surface area to volume ratio can be varied for a given polymeric carrier by size reduction, e.g., by chopping or grinding. Generally, for a given polymeric carrier, the rate of absorption can be increased by size reduction.

The polymeric carrier material is preferably ground prior to contacting the organic waste fluid to be absorbed. Grinding substantially increases the efficiency and decreases the time required to carry out the absorption step of the instant invention. A prerequisite to this however is that there be a certain degree of rigidity in the polymeric material to enable efficient grinding, and to prevent reagglomeration when stored under conventional loading pressures.

In a specific preferred embodiment of the present invention, vulcanized rubber is ground for use as a carrier medium. Vulcanization, and optionally a reinforcing filler such as carbon black, gives the rubber sufficient rigidity to allow it to be effectively ground.

Generally, the particle size range is limited solely by considerations such as the time available for the contacting step as determined by the absorption rate into the polymeric carrier particle, and equipment available for grinding. However, the preferred scrap tire particle size range is from about three inch by three inch chips to approximately 100 mesh. Most preferably the tires are chopped to about $\frac{1}{4}''$ by $\frac{1}{4}''$ particles and then ground either cryogenically or on a cracker mill until the particles can pass through a 40 mesh screen.

Grinding as contemplated by the present invention can be done in any conventional manner, such as between heavy steel rolls wherein the roll speed and differential will determine the size of the ground rubber. Grinding increases the surface area per volume of the polymeric carrier, thereby increasing the diffusion rate per volume of carrier, which further results in decreasing the time of organic fluid absorption to the point of preferred saturation. The permeability of the carrier polymers generally tends to increase with increasing polarity of the polymers employed, consequentially, methyl groups will generally decrease the absolute permeability of a carrier polymer. If a more polar polymer is employed as a carrier the degree of grinding would need to be correspondingly increased to obtain the same absorption efficiency.

This process to dispose of undesirable toxic halogenated hydrocarbons has several additional advantages not yet mentioned. If the toxic material is a volatile liquid, it would customarily be stored in barrels or other closed containers. These containers are subject to corrosion and/or mechanical damage which can produce leakage and escape of the toxic material into the environment.

It is to be emphasized, however, that once absorbed into rubber chips, the toxic waste material has greatly reduced vapor pressure; can be extracted from the rubber only with great difficulty; and, if spilled, can easily be collected. Thus, even before incineration, the toxic waste material absorbed into a polymeric carrier is converted to a composition that can be safely transported and stored.

In a specific embodiment of the present invention, polychlorinated biphenyls (PCB) or a mixture of PCB and oil are absorbed on a scrap tire carrier polymer. The scrap tires are initially ground or chopped to a size suitable for fuel. Then in an enclosed container, a quantity of PCB is contacted with a quantity of ground rubber chips. The mixture is then agitated in a solid blender or, for example, by rotating the container, thereby effectively coating the rubber chips. The PCB or PCB and oil mixture is rapidly absorbed into the rubber carrier particles to form a true solution of the PCB or PCB and oil within the rubber carrier polymer. The PCB so absorbed is now relatively innocuous to the environment since it can only be extracted from the rubber slowly and with difficulty. Furthermore, the PCB laden carrier particles so contacted are in a form suitable for incineration in an appropriate boiler or furnace such as a ceramic kiln or a fluidized bed furnace.

In using scrap tires, with its vulcanization and carbon black fillers, a burn temperature in the range of 1500°–2000° C. can be obtained. Such a temperature is required for PCB incineration, in that at a burn temperature below 900° C., PCB has a tendency to break down into dibenyzlfurans.

In another specific preferred embodiment of the present invention, it is possible to contact a ground scrap rubber polymeric carrier with a vapor of tetrachloroethylene. Ground scrap rubber is ground as noted above and placed into a sealable container or room. To a predetermined quantity of the ground rubber carrier is added tetrachloroethylene in a weight range of 1:100 to 1:1 and preferably in a ratio of 1:10. The two components are allowed to remain in contact for a period ranging from a few hours to days dependent on the size of the rubber chips and the gross mass of the mixture. The volatile organic hydrocarbon will be absorbed by the ground rubber carrier particles. Preferably, sufficient rubber carrier is present that the total amount of organic hydrocarbon absorbed does not exceed 20% of the original rubber weight.

The absorbed tetrachloroethylene in the rubber carrier particle, which acts as a solvent, will have a greatly reduced vapor pressure and will be stable for manipulation and transportation for disposal in an appropriate manner, such as incineration. As an incineration fuel the dissolved organic halides will be uniformly released and burned with the rubber carrier particles.

Other embodiments of the invention will be apparent to those skilled in the art from a consideration of this specification or practice of the invention disclosed herein. It is intended that the specification and examples be considered as exemplary with the true scope and spirit of the invention being indicated only by the following claims.

We claim:

1. A process for the disposal of toxic organic waste compounds comprising contacting the particulate scrap vulcanized rubber in the size range from 100 mesh to about $\frac{1}{4}''$ by $\frac{1}{4}''$-particles reinforced with carbon black, with a liquid halogenated hydrocarbon with or without heteroatoms, and absorbing said liquid into said particles in a quantity sufficient to provide structurally stable particles which are suitable for incineration at a temperature in the range from 1500° C. to 2000° C.

2. The process of claim 1, wherein the halogenated hydrocarbon is a polychlorinated biphenyl liquid.

3. The process of claim 2, wherein the polychlorinated biphenyl is contacted with said carrier medium in a weight ratio of 1:100 to 1:1.

4. The process of claim 1, wherein the halogenated hydrocarbon is gaseous tetrachloroethylene.

5. The process of claim 4, wherein the gaseous tetrachloroethylene is contacted with said carrier medium in a weight ratio range of 1:100 to 1:1.

6. A solid fuel of scrap vulcanized rubber particles suitable for incineration, said fuel produced by contacting said particles in the size range from 100 mesh to about ¼" by ¼" particles reinforced with carbon black, with a liquid halogenated hydrocarbon with or without heteroatoms, in a quantity sufficient to produce structurally stable particles for incineration which are suitable for incineration at a temperature in the range from 1500° C. to 2000° C.

7. The product of claim 6, wherein the halogenated hydrocarbon is a polychlorinated biphenyl liquid.

8. The product of claim 7, wherein the polychlorinated biphenyl is contacted with said carrier particles in a weight ratio range of 1:100 to 1:1.

9. The product of claim 6, wherein the halogenated hydrocarbon is gaseous tetrachloroethylene.

10. The product of claim 9, wherein the gaseous tetrachloroethylene is contacted with said carrier particles in a weight ratio range of 1:100 to 1:1.

* * * * *

UNITED STATES PATENT AND TRADEMARK OFFICE
CERTIFICATE OF CORRECTION

PATENT NO. : 4,764,282

DATED : August 16, 1988

INVENTOR(S) : Robert H. Snyder

It is certified that error appears in the above-identified patent and that said Letters Patent is hereby corrected as shown below:

Column 6, line 59, "contacting the particulate scrap" should read
-- contacting particulate scrap --.

Signed and Sealed this

Thirteenth Day of February, 1990

Attest:

JEFFREY M. SAMUELS

Attesting Officer     Acting Commissioner of Patents and Trademarks